(12) United States Patent
Wu et al.

(10) Patent No.: US 10,165,292 B2
(45) Date of Patent: Dec. 25, 2018

(54) METHOD AND APPARATUS FOR INTRA BLOCK COPY MODE IN VIDEO CODING SYSTEM WITH PIPELINE ARCHITECTURE

(71) Applicant: MediaTek Inc., Hsin-Chu (TW)

(72) Inventors: Tung-Hsing Wu, Chiayi (TW); Han-Liang Chou, Baoshan Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 276 days.

(21) Appl. No.: 15/000,190

(22) Filed: Jan. 19, 2016

(65) Prior Publication Data

US 2016/0227238 A1 Aug. 4, 2016

Related U.S. Application Data

(60) Provisional application No. 62/110,679, filed on Feb. 2, 2015.

(51) Int. Cl.
| | |
|---|---|
| H04B 1/66 | (2006.01) |
| H04N 19/436 | (2014.01) |
| H04N 19/52 | (2014.01) |
| H04N 19/56 | (2014.01) |
| H04N 19/593 | (2014.01) |
| H04N 19/433 | (2014.01) |

(52) U.S. Cl.
CPC ......... *H04N 19/436* (2014.11); *H04N 19/433* (2014.11); *H04N 19/52* (2014.11); *H04N 19/56* (2014.11); *H04N 19/593* (2014.11)

(58) Field of Classification Search
CPC ....... H04N 19/436; H04N 19/52; H04N 19/56
See application file for complete search history.

(56) References Cited

U.S. PATENT DOCUMENTS

| | | | |
|---|---|---|---|
| 2014/0301465 A1 | 10/2014 | Kwon et al. | |
| 2015/0271517 A1* | 9/2015 | Pang | H04N 19/105 |
| | | | 375/240.02 |
| 2016/0105682 A1* | 4/2016 | Rapaka | H04N 19/44 |
| | | | 375/240.12 |

OTHER PUBLICATIONS

Laroche et al., ("AHG14 on IBC constraint for Wavefront Parallel Processing;" Joint Collaborative Team on Video Coding (JCT-VC) of ITU-T SG 16 WP 3 and ISO/IEC JTC1/SC 29/WG 11; Oct. 2014 (cited in IDS)).*
Laroche, G., et al.; "AHG14 on IBC constraint for Wavefront Parallel Processing;" Joint Collaborative Team on Video Coding (JCT-VC) of ITU-T SG 16 WP 3 and ISO/IEC JTC 1/SC 29/WG 11; Oct. 2014; pp. 1-5.
Chuang, T.D., et al.; "Algorithm and Architecture Design for Instra Prediction in H.264/AVC High Profile;" pp. 1-5.

* cited by examiner

*Primary Examiner* — Sathyanaraya V Perungavoor
*Assistant Examiner* — Peet Dhillon
(74) *Attorney, Agent, or Firm* — McClure, Qualey & Rodack, LLP

(57) ABSTRACT

Method and apparatus of video coding using coding modes including Intra Block Copy (IntraBC) for a video coding system incorporating multi-stage pipeline processing is disclosed. In order to overcome data dependency issue due to the use of pipeline architecture, a first embodiment uses constrained previous reconstructed region for IntraBC estimation by excluding unavailable reconstructed previous reconstructed data due to the multi-stage pipeline processing. In the second embodiment, the unavailable reconstructed data is replaced by source pixel data.

21 Claims, 6 Drawing Sheets

METHOD AND APPARATUS FOR INTRA BLOCK COPY MODE IN VIDEO CODING SYSTEM WITH PIPELINE ARCHITECTURE

CROSS REFERENCE TO RELATED APPLICATIONS

The present invention claims priority to U.S. Provisional Patent Application Ser. No. 62/110,679, filed on Feb. 2, 2015. The U.S. Provisional Patent Application is hereby incorporated by reference in its entirety.

FIELD OF THE INVENTION

The present invention relates to video coding including Intra-block copy (IntraBC) mode. In particular, the present invention relates to techniques of efficient IntraBC coding for video coding system incorporating pipeline structure.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). According to the original IntraBC method, the displacement vector between a current block and a reference block is restricted to be in the horizontal direction (i.e., one-dimensional (1D) IntraBC). The prediction block is obtained from the already reconstructed region. The displacement vector is also referred as Block Vector (BV). IntraBC relies on reconstructed reference data in the same picture to generate predictors for a current block. It is considered as Intra-prediction coding in the sense that the prediction is derived from the same picture as the picture being coded. However, the coding process for IntraBC is similar to that for Inter-frame coding. However, the reference data for IntraBC coding is based on the reconstructed samples in the current picture instead of the previously coded frames.

The IntraBC process adopted by HEVC allows the use of two-dimensional BV. The reference data includes previously coded blocks in the same frame as the block being coded. FIG. 1 illustrates an example of previous reconstructed region corresponding to reconstructed data before the deblocking process prior to a current encoding block according to HEVC. In order to encode a current block, a best candidate block in the previously reconstructed region is first identified. The best candidate block is identified by the block vector (BV 210), which points from the current block to the best candidate block as shown in FIG. 2. There are various ways to determine the best candidate block and the decision is made at the encoder side. For example, the encoder may select the best candidate block by minimizing the mean squared errors between the candidate block and the current block. The encoder may also select the best candidate block by achieving the optimal rate-distortion performance associated with using the candidate block as the predictor for the current block.

In HEVC, wavefront parallel processing (WPP) is supported, where each row of Coding Tree Units (CTUs) can be processed in parallel as sub-streams by multiple encoding or decoding threads. In order to limit the degradation of coding efficiency, a wavefront pattern of processing order ensures that dependencies on spatial neighbors are not changed. In order to be compliant to the WPP process, the valid previous reconstruction region is reduced as shown in FIG. 3, wherein each square corresponds to a CTU and the valid previous reconstructed region has a ladder shape. In the current HEVC reference software, the valid previous reconstruction region as shown in FIG. 3 is always used regardless of whether WPP coding or non-WPP coding is used. The valid previous reconstruction in FIG. 3 is also referred as the wave-front parallel process (WPP) format.

In hardware based implementation of video encoder incorporating IntraBC mode, pipeline architecture may be used to support the multiple encoding functions involved in IntraBC encoding. The multiple encoding functions may be mapped to the multi-stage pipeline processors (or multi-stage pipeline processing units). Each stage of IntraBC processing may be mapped to one stage pipeline processor (or one stage pipeline processing unit). An exemplary pipeline processing for IntraBC encoding is illustrated in FIG. 4, where the key encoding process is divided into three functional blocks corresponding to motion estimation/Intra block copy (IntraBC) block vector (BV) estimation 410, mode decision 420, and reconstruction/entropy encoding 430. Each of the three functional blocks can be mapped to a suitable processor in the pipeline architecture. As mentioned before, the processing of the IntraBC mode is similar to that of the Inter prediction mode. Therefore, the pipeline architecture in FIG. 4 can handle blocks coded in the Inter prediction mode or IntraBC mode. In the first stage, the encoder determines the motion vector for the Inter prediction mode and block vector for the IntraBC mode. In the second stage, the encoder determines a best mode according to a certain performance criterion. For example, the performance criterion may correspond to the best rate-distortion performance by using a rate-distortion optimization process. After the mode is selected, the encoder generates the compressed bitstream using entropy coding process. Since the reconstructed samples may be used as reference data for later encoding process, the coded data has to be reconstructed in the encoder side.

When an encoder incorporates the pipeline architecture, there may be data dependency between a current block and neighboring reconstructed blocks for IntraBC coding. The pipeline structure is efficient when all pipeline stages can work concurrently. The data dependency may affect the performance of the pipeline-based encoder implementation. Accordingly, it is desirable to develop methods and/or apparatus to overcome the issue.

BRIEF SUMMARY OF THE INVENTION

A method and apparatus of video coding using coding modes including Intra Block Copy (IntraBC) for a video coding system incorporating multi-stage pipeline processing is disclosed. In order to overcome data dependency issue due to the use of pipeline architecture, a first embodiment according to the present invention uses constrained previous reconstructed region for IntraBC estimation by excluding unavailable reconstructed previous reconstructed data due to the multi-stage pipeline processing. A selected-stage pipeline processing can be applied to the current encoding block using the constrained previous reconstructed region to identify a best candidate block from the constrained previous reconstructed region for the current encoding block identifies a block vector (BV) pointing from the current encoding block to the best candidate block. Each encoding block may correspond to one coding unit (CU), or one prediction unit (PU).

The unavailable previous reconstructed data due to the multi-stage pipeline processing comprises one or more previous encoding blocks being processed by the remaining stage pipeline processing after the selected-stage pipeline processing. For a video coding system using the Wave-front Parallel Processing (WPP) format, the unavailable previous reconstructed data due to the multi-stage pipeline processing comprises one or more corresponding previous encoding blocks being processed concurrently with each of current wave-front encoding blocks. The previous processed region may include all encoding blocks processed before the current encoding block. The previous processed region may correspond to a selected region including all encoding blocks processed before the current encoding block according to the WPP format.

In order to overcome data dependency issue due to the use of pipeline architecture, a second embodiment according to the present invention uses constrained previous reconstructed region for IntraBC estimation by using source pixel data for unavailable previous reconstructed data due to the multi-stage pipeline processing. The method applies a selected-stage pipeline processing to the current encoding block using first pixel data corresponding to source pixel data for unavailable previous reconstructed data due to the multi-stage pipeline processing to determine for the IntraBC estimation. The first pixel data may be stored in the memory, which may comprise the source pixel data for the unavailable previous reconstructed data due to the multi-stage pipeline processing. In one embodiment, the method will store the source pixel data of the current encoding block after the selected-stage pipeline processing is applied to the current encoding block. Alternatively, the memory may comprise available reconstructed pixel data within a previous processed region. In this case, the method will store the source pixel data of the current encoding block after the selected-stage pipeline processing is applied to the current encoding block and store newly reconstructed pixel data resulted from applying the remaining-stage pipeline processing to one or more previous encoding blocks.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
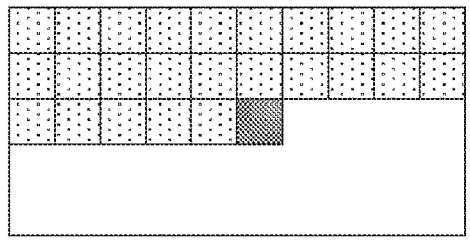
FIG. 1 illustrates an example of previous reconstructed region corresponding to reconstructed data before the deblocking process prior to a current encoding block according to HEVC.
Figure 2:
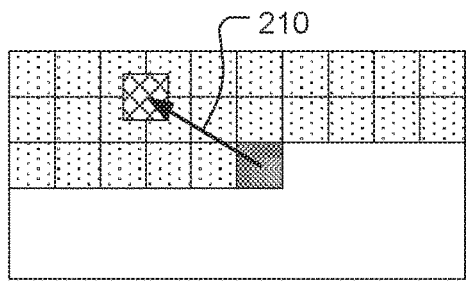
FIG. 2 illustrates an example of the best candidate block and the associated block vector that points from the current block to the best candidate block.
Figure 3:
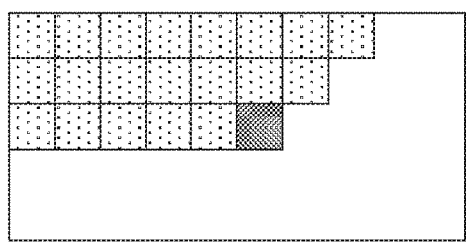
FIG. 3 illustrates an example of the valid previous reconstruction region when wave-front parallel processing is used, wherein each square corresponds to a CTU.
Figure 5:
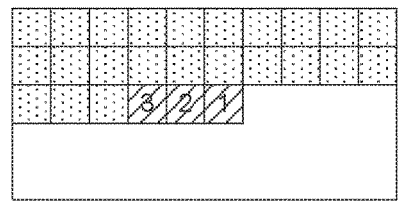
FIG. 5 illustrates an example that the reconstructed blocks are not available due to the pipeline architecture.

As shown in FIG. 2 and FIG. 3, the reference data for the current block corresponds to the reconstructed region or the valid reconstructed region, which includes the reconstructed blocks immediately prior to the current block. These reconstructed blocks immediately prior to the current block may not be available yet when the pipeline architecture is used. FIG. 5 illustrates an example that the reconstructed blocks are not available due to the pipeline architecture. In FIG. 5, blocks 1, 2 and 3 are three blocks being processed by the pipeline processors. Video encoder executes the first stage pipeline processing for IntraBC encoding on block 1, the second stage pipeline processing for IntraBC encoding on block 2, and the third stage pipeline processing for IntraBC encoding on block 3, concurrently. In other words, the encoder applies MV/BV estimation on the current block (i.e., block 1) using first-stage pipeline processor. At the same time, the encoder applies mode selection process on a previous block (i.e., block 2) using the second-stage pipeline processor, where block 2 has been processed by the MV/BV estimation process. Furthermore, at the same time, the encoder also applies reconstruction process/entropy encoding process on block 3 using the third-stage pipeline processor, where block 3 has been processed by the MV/BV estimation process and the mode selection process. Therefore, when block 1 is being processed for MV/BV estimation, the neighboring blocks 2 and 3 are not yet reconstructed. Accordingly, MV/BV estimation for block 1 cannot be performed until blocks 2 and 3 are reconstructed. In other words, the first-stage pipeline processing for block 1 has to wait until second stage and third stage finish processing block 2 and block 3. This would defeat the purpose of pipeline concurrent processing. When more stages are involved in the pipeline architecture, the first-stage processing for the current block would have to wait for all other stages to finish processing.

Figure 4:
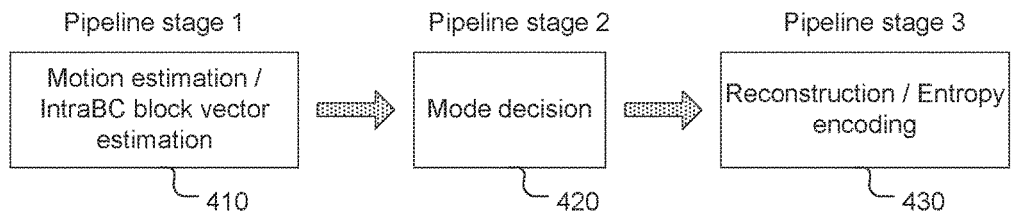
FIG. 4 illustrates an exemplary pipeline processing of IntraBC encoding, where the key encoding process is divided into three functional blocks corresponding to motion estimation/Intra block copy (IntraBC) block vector (BV) estimation, mode decision, and reconstruction/entropy encoding.
Figure 6:
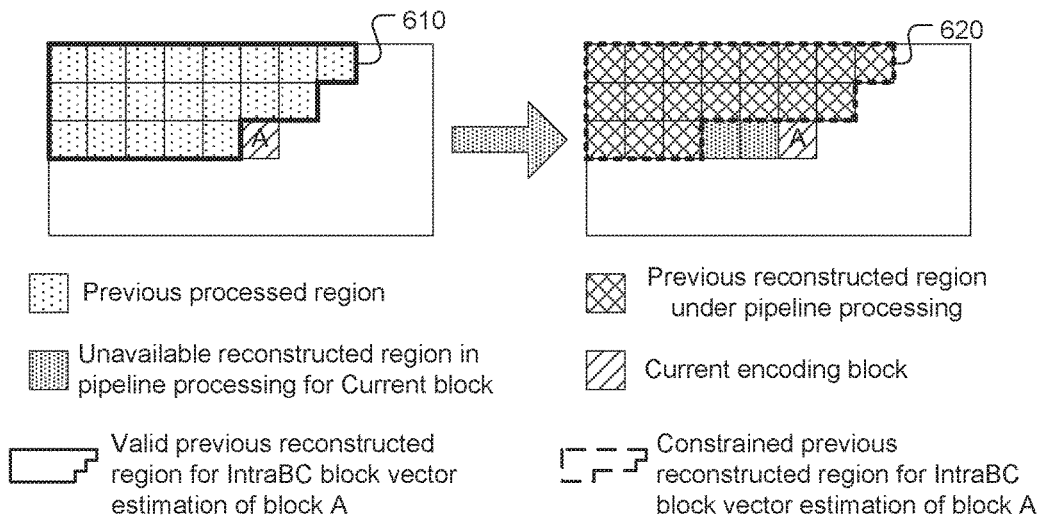
FIG. 6 illustrates an example of constrained reconstructed region incorporating an embodiment of the present invention by excluding unavailable previous reconstructed data.

In order to overcome the data dependency issue, a first technique is disclosed to overcome the issue by constraining the reconstructed region for BV estimation in the IntraBC mode. The constrained reconstructed region for BV estimation will further exclude the unavailable reconstructed region due to pipeline processing. For example, if the three-stage pipeline architecture of FIG. 4 is used, the two previous blocks to the left of the current block will be excluded from the constrained reconstructed region for BV estimation. FIG. 6 illustrates an example of constrained reconstructed region incorporating an embodiment of the present invention. In FIG. 6, previous reconstructed region 610 corresponds to the area allowed for conventional non-wave-front parallel IntraBC encoding, where block A is being processed. As mentioned before, the selected reconstructed region (i.e., the WPP format) as shown in FIG. 3 is always used in HEVC reference software implementation regardless whether WPP is imposed or not. The previous reconstructed region 610 may also include unavailable reconstructed data when pipeline architecture is used. Therefore, the previous reconstructed region 610 may also be referred as previous processed region if the pipeline architecture is used. The present invention is not limited to the reconstructed region with the WPP format and can be applied to the case for the reconstructed region without WPP format as shown in FIG. 2.

In the above discussion, the three-stage pipeline as shown in FIG. 4 has been used to illustrate the issue of data dependency using pipeline processing for IntraBC coding. In particular, the IntraBC estimation is assumed to be performed in the first stage. Nevertheless, the IntraBC estimation can be performed in any selected stage of the multi-stage pipeline processing. The data dependency issue still exists between the selected stage and remaining stage. While the discussion is based on IntraBC estimation being performed in the stage-stage pipeline processing, it is understood that the IntraBC estimation can be performed in any selected-stage pipeline processing.

In order to overcome the data dependency issue associated with the use of pipeline architecture, the constrained reconstructed region excludes the unavailable region. For the case of three-stage pipeline architecture, the unavailable region includes the two previous blocks to the left of the current block as shown in the constrained reconstructed region 620 as shown in FIG. 6. Depending on the number of stages in the pipeline architecture, more or less previous blocks to the left of the current block may be excluded from the search area. The unavailable reconstructed blocks due to the use of pipeline architecture may affect the coding performance of IntraBC slightly. However, it allows the multi-stage pipeline processors to continue to run concurrently.

Figure 7:
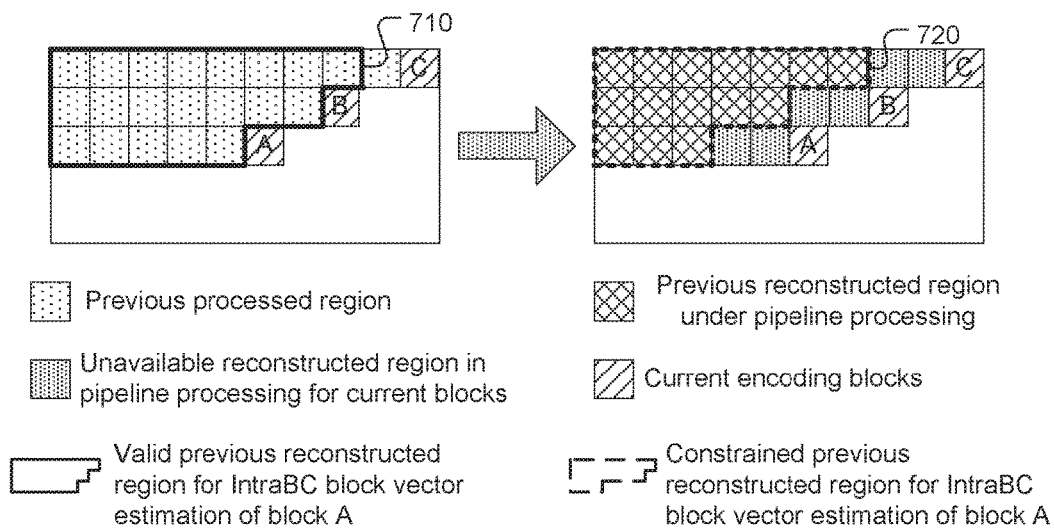
FIG. 7 illustrates an example of constrained reconstructed region incorporating an embodiment of the present invention for WPP, where three parallel processors are used to encode parallel wave-front blocks A, B and C respectively.

FIG. 7 illustrates an example of constrained reconstructed region incorporating an embodiment of the present invention for WPP, where three parallel processors are used to encode parallel wave-front blocks A, B and C respectively. Each WPP processor uses three-stage pipeline architecture. In FIG. 7, previous processed region 710 corresponds to the area allowed for wave-front parallel IntraBC encoding, where block A is being processed. As mentioned before, the reconstructed region with the WPP format is always used in HEVC reference software implementation regardless whether WPP is imposed or not. In order to overcome the data dependency issue associated with the use of pipeline architecture, the constrained reconstructed region 720 excludes the unavailable region due to the pipeline processing for IntraBC BV estimation of block A. As shown in FIG. 7, the constrained reconstructed region 720 for block A not only excludes the two previous blocks to left of the block A, but also excludes the two previous blocks to left of the block B and the two previous blocks to left of the block C. For convenience, blocks A, B and C that are processed by WPP concurrently are referred as current wave front encoding blocks.

As disclosed above, the first technique of the present invention overcome the data dependency issue associated with pipeline processing by excluding any unavailable region due to the pipeline processing from the reconstructed region associated with conventional IntraBC coding. The reconstructed region associated with conventional IntraBC coding may correspond to the whole previously reconstructed region before the current block. The reconstructed region associated with conventional IntraBC coding may also correspond to the valid reconstructed region with the WPP format.

In a second technique, the data dependency issues associated with the pipeline processing is overcome by using source pixel data for IntraBC estimation in instead of the previous reconstructed data. In the conventional IntraBC coding process, the IntraBC estimation process determines a best candidate and a BV based on previous reconstructed data to generate predictors for a current block. Due to the use of pipeline processing, the previous reconstructed blocks B and C are not available when the first-stage pipeline processing is applied to block A. One embodiment according to the present invention uses a memory to store pixel data used for IntraBC estimation. For example, when the first-stage pipeline processing is applied to block A, source pixel data for block B and block C are already stored in the memory. Therefore, IntraBC estimation process for block A can be performed without the need to wait for reconstructed blocks B and C.

Figure 8:
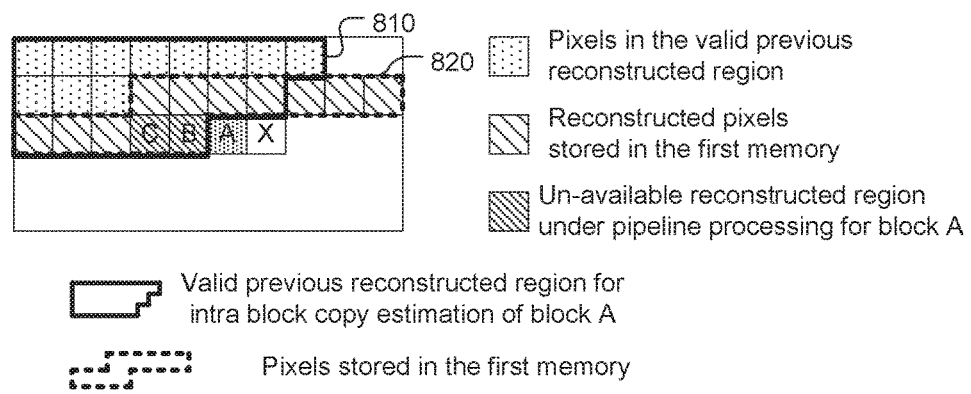
FIG. 8 illustrates an example of IntraBC estimation using source pixel data for unavailable reconstructed data, where previous reconstructed data within a previous processed region is stored in a memory for IntraBC estimation and unavailable reconstructed data is replaced by source pixel data.

FIG. 8 illustrates an example of IntraBC estimation using source pixel data for unavailable reconstructed data, where previous reconstructed data within a previous processed region is stored in a memory for IntraBC estimation and unavailable reconstructed data is replaced by source pixel data. Area 810 outlined by solid lines corresponds to valid previous reconstructed region. Area 820 outlined by dashed lines corresponds to pixel data stored in the memory. The IntraBC estimation for block A searches the memory to identify the best candidate block and associated BV. After the first-stage pipeline processing is complete for block A, the third-stage pipeline processing for block C should be complete in the same time frame. The reconstructed block C is stored in the memory to replace the source pixels of block C. On the other hand, the source pixels of block A are stored in the memory for IntraBC estimation of subsequent block. When the next block (i.e., block X) is processed by the first-stage pipeline processing, the source pixels of blocks A and B in the memory will be used for the IntraBC estimation. In FIG. 8, the memory stores the reconstructed pixels for IntraBC estimation. When the reconstructed pixels for IntraBC estimation are not available, the unavailable pixels are replaced by the source pixels.

In the above example, the same memory is used to store the source pixels as well as reconstructed pixels for IntraBC estimation. However, separate memories may be used to store the source pixels and the reconstructed pixels individually for IntraBC estimation. Both memories may be updated along the progress of the pipeline processing.

Figure 9:
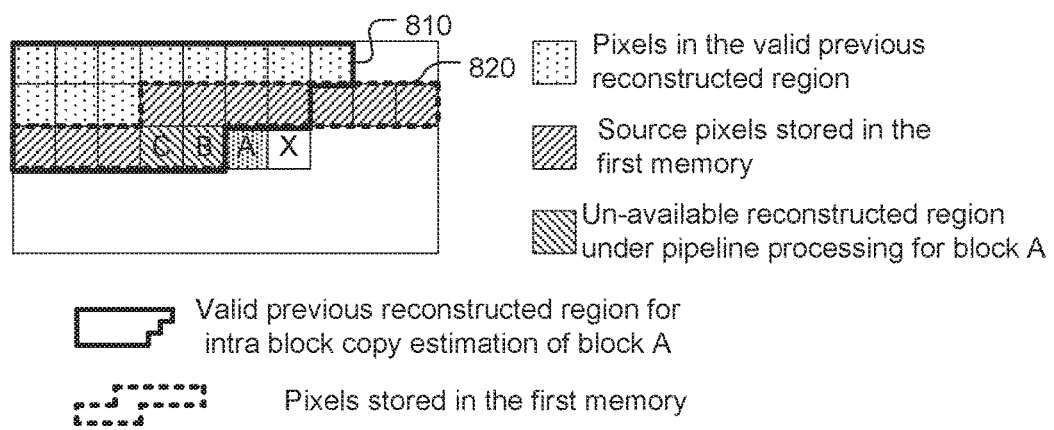
FIG. 9 illustrates an example of IntraBC estimation using source pixel data for unavailable reconstructed data, where source pixel data within a previous processed region is stored in a memory for IntraBC estimation.

FIG. 9 illustrates another embodiment for IntraBC coding based on pipeline architecture, where the IntraBC encoding does not need to wait for availability of reconstructed data that are still being processed by the pipeline processor. The system is similar to that in FIG. 8. However, the memory stores source pixels for IntraBC estimation. After the first-stage pipeline processing is complete for block A, the third-stage pipeline processing for block C should be complete in the same time frame. However, the reconstructed block C is not stored in the memory.

Figure 10:
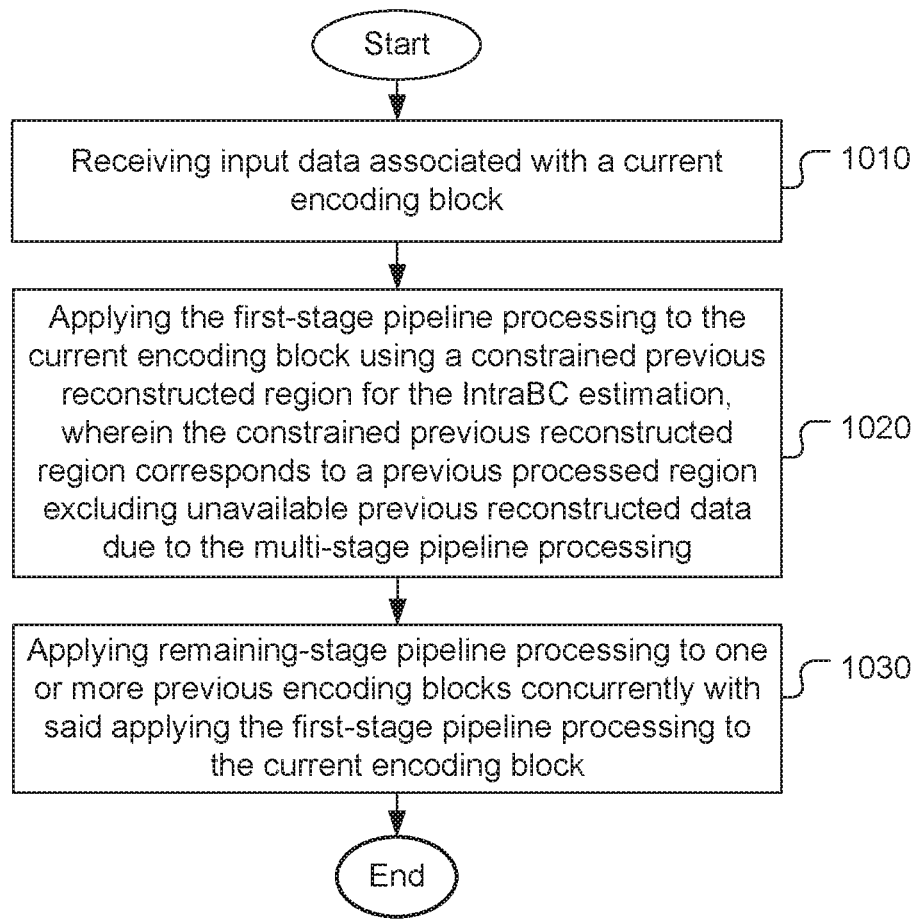
FIG. 10 illustrates an exemplary flowchart for a coding system incorporating an embodiment of the present invention, where the system uses constrained previous reconstructed region by excluding unavailable reconstructed data for IntraBC estimation to overcome data dependency associated with the use of pipeline architecture.

FIG. 10 illustrates an exemplary flowchart for a coding system incorporating an embodiment of the present invention, where the system uses constrained previous reconstructed region by excluding unavailable reconstructed data for IntraBC estimation to overcome data dependency associated with the use of pipeline architecture. The system receives input data associated with a current encoding block as shown in step 1010. The input data corresponds to source pixel data of the current encoding block to be coded. The input data may be retrieved from memory (e.g., computer memory, buffer (RAM, SRAM or DRAM) or other media) or from a processor. The first-stage pipeline processing is applied to the current encoding block using a constrained previous reconstructed region for the IntraBC estimation in step 1020, where the constrained previous reconstructed region corresponds to a previous processed region excluding unavailable previous reconstructed data due to the multi-stage pipeline processing. The remaining-stage pipeline processing is applied to one or more previous encoding blocks concurrently with said applying the first-stage pipeline processing to the current encoding block in step 1030.

Figure 11:
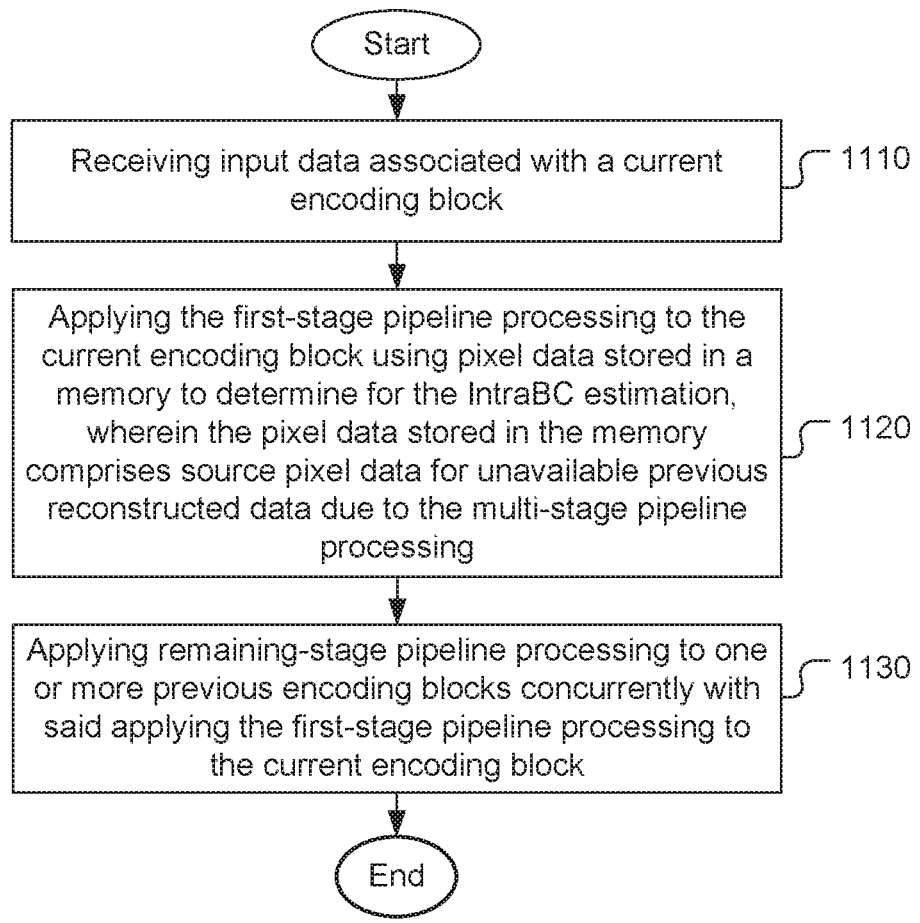
FIG. 11 illustrates an exemplary flowchart for a coding system incorporating an embodiment of the present invention, where the system uses source pixel data to replace unavailable reconstructed data for IntraBC estimation to overcome data dependency associated with the use of pipeline architecture.

FIG. 11 illustrates an exemplary flowchart for a coding system incorporating an embodiment of the present invention, where the system uses source pixel data to replace unavailable reconstructed data for IntraBC estimation to overcome data dependency associated with the use of pipeline architecture. The system receives input data associated with a current encoding block as shown in step 1110. The first-stage pipeline processing is applied to the current encoding block using pixel data stored in a memory to determine for the IntraBC estimation in step 1120, where the pixel data stored in the memory comprises source pixel data for unavailable previous reconstructed data due to the multi-stage pipeline processing. The remaining-stage pipeline processing is applied to one or more previous encoding blocks concurrently with said applying the first-stage pipeline processing to the current encoding block in step 1130.

The flowcharts shown above are intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding video data using coding modes including Intra Block Copy (IntraBC) for a video coding system incorporating multi-stage pipeline processing, the method comprising:

receiving input data associated with a current encoding block;

applying selected-stage pipeline processing to the current encoding block using a constrained previous reconstructed region for IntraBC estimation, wherein the constrained previous reconstructed region corresponds to a previous processed region excluding unavailable previous reconstructed data corresponding to one or more blocks of a same row as the current encoding block due to the multi-stage pipeline processing; and applying remaining-stage pipeline processing after said selected-stage pipeline processing to one or more previous encoding blocks concurrently with said applying said selected-stage pipeline processing to the current encoding block.

2. The method of claim 1, wherein said applying said selected-stage pipeline processing to the current encoding block identifies a best candidate block from the constrained previous reconstructed region for the current encoding block, and identifies a block vector (BV) pointing from the current encoding block to the best candidate block.

3. The method of claim 1, wherein said unavailable previous reconstructed data due to the multi-stage pipeline processing comprises said one or more previous encoding blocks being processed by said applying remaining stage pipeline processing concurrently with said applying said selected-stage pipeline processing to the current encoding block.

4. The method of claim 1, wherein for a Wave-front Parallel Processing (WPP) video coding system, said unavailable previous reconstructed data due to the multi-stage pipeline processing comprises one or more corresponding previous encoding blocks being processed concurrently with each of current wave-front encoding blocks.

5. The method of claim 1, wherein one encoding block corresponds to one coding unit (CU), or one prediction unit (PU).

6. The method of claim 1, wherein the previous processed region corresponds to a selected region including all encoding blocks processed before the current encoding block according to wave-front parallel process (WPP) format.

7. An apparatus for coding video data using coding modes including Intra Block Copy (IntraBC) for a video coding system, the apparatus comprising:

multi-stage pipeline processors include one selected-stage pipeline processor and one or more remaining-stage pipeline processors after said one selected-stage pipeline processor, wherein the multi-stage pipeline processors are configured to:

receive input data associated with a current encoding block;

apply IntraBC estimation to the current encoding block using said one selected-stage pipeline processor, wherein the IntraBC estimation is based on a constrained previous reconstructed region corresponding to a previous processed region excluding unavailable previous reconstructed data corresponding to one or more blocks of a same row as the current encoding block due to multi-stage pipeline processing; and apply remaining IntraBC processing to one or more previous encoding blocks using said one or more remaining-stage pipeline processors concurrently with said one selected-stage pipeline processor applied to the current encoding block.

8. The apparatus of claim 7, wherein said unavailable previous reconstructed data due to the multi-stage pipeline processing comprises said one or more previous encoding blocks being processed by said one or more remaining-stage pipeline processors concurrently with said one selected-stage pipeline processor applied to the current encoding block.

9. A method of coding video data using coding modes including Intra Block Copy (IntraBC) for a video coding system incorporating multi-stage pipeline processing, wherein selected-stage pipeline processing includes IntraBC estimation, the method comprising:

receiving input data associated with a current encoding block;

applying said selected-stage pipeline processing to the current encoding block using a first pixel data to determine for the IntraBC estimation, wherein the first pixel data corresponds to source pixel data for unavailable previous reconstructed data due to the multi-stage pipeline processing; and applying remaining-stage pipeline processing to one or more previous encoding blocks concurrently with said applying said selected-stage pipeline processing to the current encoding block.

10. The method of claim 9, wherein the first pixel data is stored in a memory and the memory comprises the source pixel data for unavailable previous reconstructed data due to the multi-stage pipeline processing.

11. The method of claim 10, wherein the memory further comprises source pixel data within a previous processed region for the current encoding block.

12. The method of claim 11, further comprising storing the source pixel data of the current encoding block after said applying said selected-stage pipeline processing to the current encoding block.

13. The method of claim 10, wherein the memory further comprises available reconstructed pixel data within a previous processed region.

14. The method of claim 13, further comprising storing the source pixel data of the current encoding block after said applying said selected-stage pipeline processing to the current encoding block, and storing newly reconstructed pixel data resulted from said applying remaining-stage pipeline processing to one or more previous encoding blocks.

15. The method of claim 10, wherein said applying said selected-stage pipeline processing to the current encoding block identifies a best candidate block for the IntraBC estimation based on the first pixel data stored in the memory and identifies a block vector (BV) pointing from the current encoding block to the best candidate block.

16. An apparatus for coding video data using coding modes including Intra Block Copy (IntraBC) for a video coding system, the apparatus comprising:

multi-stage pipeline processors include one selected-stage pipeline processor and one or more remaining-stage pipeline processors after said one selected-stage pipeline processor, wherein the multi-stage pipeline processors are configured to:

receive input data associated with a current encoding block;

apply selected-stage pipeline processing to the current encoding block using said one selected-stage pipeline processor based on first pixel data for IntraBC estimation, wherein the first pixel data corresponds to source pixel data for unavailable previous reconstructed data due to multi-stage pipeline processing associated with the multi-stage pipeline processors; and apply remaining-stage pipeline processing to one or more previous encoding blocks concurrently with said selected-stage pipeline processing applied to the current encoding block.

17. The apparatus of claim 16, wherein the first pixel data is stored in a memory and the memory comprises the source pixel data for unavailable previous reconstructed data due to the multi-stage pipeline processing.

18. The apparatus of claim 17, wherein the memory further comprises source pixel data within a previous processed region for the current encoding block.

19. The apparatus of claim 18, the multi-stage pipeline processors are configured to further store the source pixel data of the current encoding block after said selected-stage pipeline processing is applied to the current encoding block.

20. The apparatus of claim 17, wherein the memory further comprises available reconstructed pixel data within a previous processed region.

21. The apparatus of claim 20, the multi-stage pipeline processors are configured to further store the source pixel data of the current encoding block after said selected-stage pipeline processing is applied to the current encoding block, and to store newly reconstructed pixel data resulted from the remaining-stage pipeline processing applied to said one or more previous encoding blocks.

\* \* \* \* \*